No. 692,131. Patented Jan. 28, 1902.
G. J. GASTONGUAY.
COASTING AND BRAKE MECHANISM.
(Application filed Sept. 6, 1900.)
(No Model.)
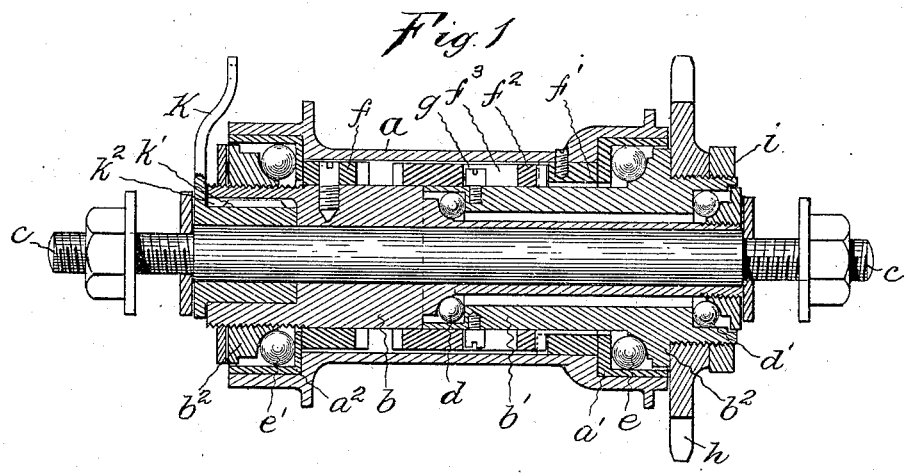
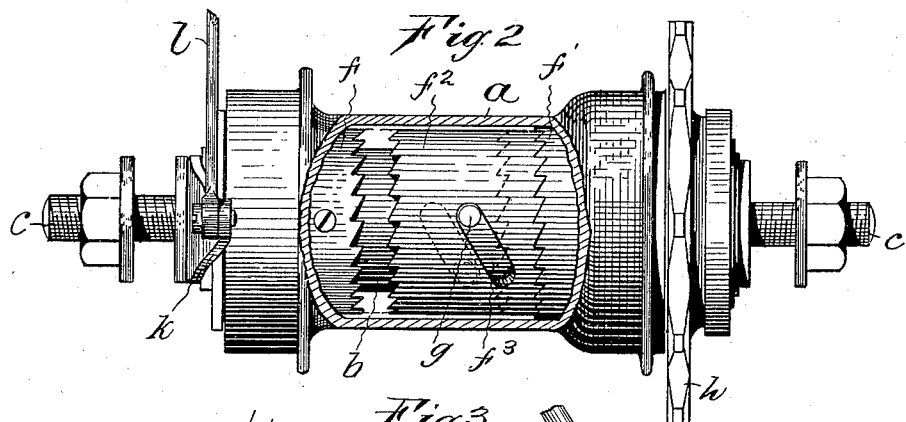
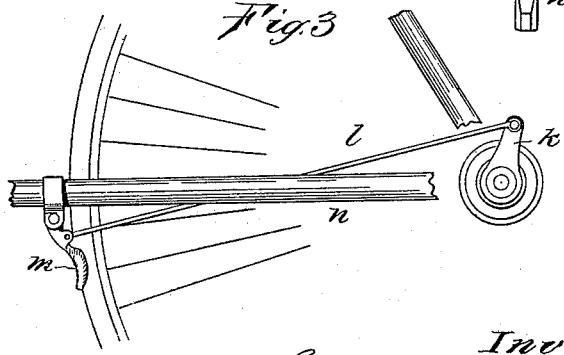
Witnesses:
Wm. H. Barker
R. H. Burdett
Inventor:
Godemir J. Gastonguay
by Chas. L. Burdett,
Attorney

UNITED STATES PATENT OFFICE.

GODEMIR J. GASTONGUAY, OF HARTFORD, CONNECTICUT.

COASTING AND BRAKE MECHANISM.

SPECIFICATION forming part of Letters Patent No. 692,131, dated January 28, 1902.

Application filed September 6, 1900. Serial No. 29,186. (No model.)

*To all whom it may concern:*

Be it known that I, GODEMIR J. GASTONGUAY, a citizen of the United States, and a resident of Hartford, in the county of Hartford and State of Connecticut, have invented certain new and useful Improvements in Coasting and Brake Mechanism, of which the following is a full, clear, and exact description, whereby any one skilled in the art can make and use the same.

My invention relates to the class of bicycle and like vehicle hubs in which provision is made for the control of the motion of the vehicle by the use of a clutch device, and my object is to provide a simple, compact, and effective form of mechanism for this purpose.

Referring to the drawings forming part hereof, Figure 1 is a view in central lengthwise section of the improved hub. Fig. 2 is a plan view of the hub with part cut away in section to show construction. Fig. 3 is a diagram view illustrating the hub in connection with one form of brake.

In the accompanying drawings my invention is shown as embodied in a bicycle-hub, although applicable for use on other forms of vehicles, and only so much of the structure and of the frame of a vehicle is shown as is necessary to enable the relation of the parts to each other and to the frame to be understood.

The letter $a$ denotes the outer hub with means for the attachment of spokes and having the flanged ends to allow room for ball-bearing sockets between this outer hub $a$ and the inner sectional hub. This inner hub is tubular, like the outer, but is formed in two sections $b\ b'$, one section extending from end to end of the outer hub and fitting upon the axle $c$, with one part of greater diameter than the other part, and the other section $b'$ of the inner hub being shorter than the main section.

The main section $b$ of the inner hub is reduced in diameter for about half its length and the other section $b'$ fits thereon, the outer diameters of the two sections, however, being substantially the same. Between these two sections $b\ b'$ of the inner hub and at the ends of the outer section ball-bearings $d\ d'$ are located in ball-races formed in the usual manner in cones on the one part and in ball-cases on the other. In like manner ball-bearings $e$ are located in one end of the outer hub $a$ between the fixed cone $b^2$ on the hub-section $b'$ and the ball-case $a'$ in the adjacent end of the outer hub $a$, and at the other end of the hub $a$ the ball-bearings $e'$ are formed by the case $a^2$ in the hub and the adjustable cone $b^3$ on the threaded end of the section $b$ of the inner hub. This construction of the extension of one section of the inner sleeve within the other allows the ball-bearings for the section $b'$ to be located between one part, so that the bearings at each end of the part $b'$ may be adjusted by the cone at the outer end of the section $b$. The adjustment of this bearing is less liable to be disturbed than would be the case if the cone were located upon the axle, as then a movement of the axle or of the cone would disturb the bearings. When the bearings between the two sections of the inner sleeve have been properly adjusted, the sleeve becomes then practically one and enables the bearings between the inner and outer sleeves to be adjusted by means of the nut $b^2$ only.

In a space between the inner surface of the hub $a$ and the outer surface of the inner hub $b\ b'$ a clutch made up (in the preferred form shown) of three sections or parts is located. These clutch parts are in the shape of rings or sleeves, which fit within the space, one part $f$ being fastened to the inner-hub section $b$ near one end, another clutch part $f'$ being fastened to the outer hub $a$ near the opposite end, and another, which is a loose clutch part $f^2$, being mounted on the inner-hub section $b'$ and free to turn and to slide lengthwise thereon to a limited extent. Both edges of the loose clutch part $f^2$ are provided with ratchet-teeth, which face in opposite directions on the opposite edges, and the inner edges of the fixed clutch parts $f\ f'$ have corresponding ratchet-teeth. The central or loose clutch part $f^2$ is held in place by means of a pin $g$, fast to the inner-hub section $b'$ and extending into a diagonal slot $f^3$, formed in the wall of the clutch part $f^2$.

On the end of the section $b'$ of the inner hub a gear-wheel $h$, which forms part of the driving mechanism, is secured, and it is held in place as by means of a lock-nut $i$ in the form shown.

At the end of the hub opposite that to which the driving-gear is secured a brake device is located. This may be made in any convenient form, but the one preferred is adopted for use in connection with a tire-brake. A recess is formed in the end of the hub-section $b$, and in this the hub of the brake-lever $k$ is located. A projecting key $k'$ extends into a socket $k^2$ in the wall of the hub-socket in the end of the inner-hub section $b$, so as to cause these two parts—the inner-hub section $b$ and the brake-lever—to move together. The outer end of the brake-lever may be connected, as by means of a rod $l$, to a tire-brake $m$, hinged to a member $n$ of the frame of the vehicle.

The operation of the device is as follows: When the gear-wheel $h$ of the driving mechanism is rotated in a forward direction, it turns with it the section $b'$ of the inner hub, to which it is fastened. This forward rotation of the inner hub carries the pin $g$ forward, so that it strikes against the side of the diagonal slot $f^3$ in the loose clutch part $f^2$ and moves such clutch part toward the clutch part $f'$, which is fast to the hub $a$ of the vehicle-wheel. As long as the forward rotation of the gear-wheel continues the wheel of which hub $a$ forms a part is rotated to drive the vehicle. As soon as the forward rotation of the gear-wheel is stopped the hub $a$ continues to revolve freely, as the teeth of the clutch parts then become disengaged. When a reverse rotating movement is imparted to the driving-gear, then the pin $g$, striking the opposite wall of the diagonal slot $f^3$, drives the loose clutch part toward and into engagement with the clutch part $f$, which is fixed to the inner-hub section $b$, causing the latter to rotate and by that means operate the brake, which is located at the end of and in connection with this inner-hub part.

A wheel having a hub of the within-described construction is attached to a vehicle-frame in any ordinary manner, as by means of the axle extending through holes in the frame and nuts secured upon the threaded ends of the axle in the usual manner.

What I claim as my invention, and desire to secure by Letters Patent, is—

1. In a vehicle, in combination, a tubular outer hub, a tubular inner hub formed in sections, said sections being supported one on the other, a clutch located between the two hubs, one of the clutch parts being secured to the outer hub and another part to a section of the inner hub, a loose clutch part mounted between the two sections of the clutch, a cam-surface and an engaging pin arranged to slide the loose clutch part, a gear-wheel fast to one hub-section, and a brake attached to the other section.

2. In a vehicle, in combination, a tubular outer hub, a tubular inner hub formed in sections, said sections being supported one on the other, a clutch located in a space between the two hubs, one of the clutch parts being secured to the outer hub and another part to a section of the inner hub, a loose clutch part mounted on the inner hub between the fixed sections of the clutch and having a diagonal slot, a pin fast to the shorter of the inner-hub sections and extending into said slot, a gear-wheel fast to one hub-section and a brake connected with the opposite end of the inner-hub section.

3. In a vehicle, in combination, a tubular outer hub, a tubular inner hub formed in sections, said sections being supported one on the other, a clutch part located between the two hubs and having teeth on its opposite edges and adapted to slide lengthwise of the hub, the two fixed clutch parts, one secured to the outer hub and the other to a section of the inner hub, a cam-surface and an engaging pin arranged to slide the loose clutch part, a gear-wheel fast to one section of the hub and a brake attached to the other section.

4. In a coasting and brake mechanism, a tubular outer hub, a tubular inner hub formed in sections, a clutch adapted to connect the two hubs, and including a clutch part secured to the outer hub another part to a section of the inner hub and a loose clutch part to engage the other clutch parts, a cam-surface and an engaging pin arranged to slide the loose clutch part, a drive-wheel fast to one hub-section, ball-bearings for each end of said hub-section, and a brake connected with the other hub-section.

5. In a coasting and brake mechanism, a tubular outer hub, a tubular inner hub including two sections one supported on the other, ball-bearings located at each end of the supported hub-section, a clutch adapted to connect the two hubs and including a clutch part secured to each of said hub-sections and a loose clutch part to connect said parts, a cam-surface and an engaging pin arranged to slide the loose clutch part, a drive-wheel fast to one hub-section and a brake connected to the other section.

6. In a coasting and brake mechanism, a tubular outer hub, a sectional, tubular inner hub, one section of which is reduced in diameter and the other section of which is supported on said reduced portion, a clutch adapted to connect the two hubs and including a clutch part secured to one of said hub-sections, another to the outer hub, and a loose clutch part to connect said parts, a cam-surface and an engaging pin arranged to slide the loose clutch part, a drive-wheel fast to one hub-section and a brake connected with the other hub-section.

7. In a coasting and brake mechanism, a tubular outer hub, a sectional, tubular inner hub having a regular outer surface at the meeting-point of the two sections, one section of the hub being reduced in diameter and the other section of the hub being supported on said reduced portion, a clutch including a member secured to one of said sections, another to the outer hub and a loose member fitting and sliding upon both of said sections, a cam-surface and an engaging pin arranged to slide the loose clutch part, a drive-wheel fast to one hub-section and a brake connected with the other hub-section.

8. In a coasting and brake mechanism, an axle, a sectional hub including a section connected with a brake device at one end and having a clutch part and reduced in diameter at its opposite end and another section mounted upon said reduced portion and having a drive-wheel secured thereto, the brake device, a slidable clutch part mounted upon the two sections, a cam-surface and a pin on said slidable clutch part and the hub-section bearing the drive-wheel, and an outer hub mounted upon the hub-section and having a clutch part adapted to be engaged by the slidable clutch part.

GODEMIR J. GASTONGUAY.

Witnesses:
WILLIAM H. BARKER,
CHAS. L. BURDETT.